United States Patent
McMahan

(10) Patent No.: US 7,152,212 B2
(45) Date of Patent: Dec. 19, 2006

(54) AUTOMATED METHODS AND SYSTEMS FOR ANALYZING DATA ASSOCIATED WITH AN INDUSTRIAL PROCESS

(75) Inventor: David M. McMahan, Raleigh, NC (US)

(73) Assignee: Bowe Bell + Howell Company, Durham, NC (US)

( * ) Notice: Subject to any disclaimer, the term of this patent is extended or adjusted under 35 U.S.C. 154(b) by 458 days.

(21) Appl. No.: 10/055,604

(22) Filed: Jan. 23, 2002

(65) Prior Publication Data

US 2002/0069034 A1 Jun. 6, 2002

Related U.S. Application Data

(62) Division of application No. 09/434,406, filed on Nov. 4, 1999, now Pat. No. 6,625,567.

(51) Int. Cl.
*G06F 3/00* (2006.01)
*G06F 9/00* (2006.01)
*G06F 17/00* (2006.01)

(52) U.S. Cl. .................. 715/771; 715/772; 702/185

(58) Field of Classification Search ............... 345/771, 345/772; 700/108, 174; 705/7; 702/185
See application file for complete search history.

(56) References Cited

U.S. PATENT DOCUMENTS

| | | | |
|---|---|---|---|
| 4,346,446 A | 8/1982 | Erbstein et al. | |
| 5,144,566 A | 9/1992 | Anderson et al. | |
| 5,260,878 A * | 11/1993 | Luppy | 700/174 |
| 5,390,107 A | 2/1995 | Nelson et al. | |
| 5,521,844 A * | 5/1996 | Karis | 702/185 |
| 5,749,291 A | 5/1998 | Nast et al. | |
| 5,828,882 A | 10/1998 | Hinckley | |
| 5,850,388 A | 12/1998 | Anderson et al. | |
| 5,870,696 A | 2/1999 | Randolph | |
| 5,896,292 A * | 4/1999 | Hosaka et al. | 700/108 |
| 5,946,661 A * | 8/1999 | Rothschild et al. | 705/7 |
| 6,038,690 A | 3/2000 | Jacobson et al. | |
| 6,182,084 B1 | 1/2001 | Cockrell et al. | |
| 6,199,018 B1 | 3/2001 | Quist et al. | |
| 6,263,290 B1 | 7/2001 | Williams et al. | |
| 6,282,267 B1 | 8/2001 | Nolting | |
| 6,324,665 B1 | 11/2001 | Fay | |
| 6,385,301 B1 | 5/2002 | Nolting et al. | |

* cited by examiner

*Primary Examiner*—Kristine Kincaid
*Assistant Examiner*—Boris Pesin
(74) *Attorney, Agent, or Firm*—McDermott Will & Emery LLP

(57) ABSTRACT

Automated methods and systems for analyzing data associated with an industrial process parse data entries received from devices in an industrial process, such as a mail or paper processing system. The parsing can include applying state machines to the data to identify events and produce output relating to the process for which the data is being analyzed. Statistical measures are computed for the output from each of the state machines. The statistical measures are compared to design limits. Output is displayed to the user in a format that facilitates interpretation of the data.

9 Claims, 9 Drawing Sheets

TAAS Data File Name : C:\bhwrulz\pbidruiz\example.trc    9/30/99
Operator : Dave McMahan
Machine Identifier : Lab Machine - X002 System B Additional Info : Test run that contains overlapped pages exiting the TOS Form Length : 11.00 Inches

| Item Description | Minimum | Average | Maximum | Std Dev | Count | Status |
|---|---|---|---|---|---|---|
| 1) Sheet Feeder entry cell transit time | 122.8 IPS | 125.1 IPS | 127.0 IPS | 0.7 | 1498 | OK |
| 2) SF Vacuum activation to SF Entry | 35.3 mSec | 39.6 mSec | 44.5 mSec | 1.5 | 1498 | |
| 3) Sheet Feeder exit cell transit time | 94.1 IPS | 127.0 IPS | 130.3 IPS | 1.5 | 1496 | Error |
| 4) Sheet Feeder vacuum solenoid activation time | 36.8 mSec | 41.0 mSec | 46.1 mSec | 1.5 | 1498 | |
| 5) Sheet Feeder vacuum solenoid cycle rate | 8,910.7 CPH | 19,358.8 CPH | 26,344.7 CPH | 559.2 | 1497 | |
| 6) Gap at sheet feeder entry cell | 47.0 mSec | 96.7 mSec | 314.9 mSec | 8.8 | 1496 | |
| 7) Hold inside entry cell transit time | 118.9 IPS | 120.7 IPS | 122.4 IPS | 0.6 | 1496 | OK |
| 8) Hold outside entry cell transit time | 119.2 IPS | 121.0 IPS | 123.2 IPS | 1.1 | 1496 | OK |
| 9) Hold inside exit cell transit time | 117.8 IPS | 119.6 IPS | 120.9 IPS | 0.5 | 1495 | OK |
| 10) Hold outside exit cell transit time | 50.1 IPS | 119.8 IPS | 121.0 IPS | 2.6 | 1494 | OK |
| 11) TOS Entry Inside-to-Outside lead edge difference | 2.7 Inches | 3.5 Inches | 4.1 Inches | 0.4 | 48 | |
| 12) TOS inside entry transit time | 132.6 IPS | 135.2 IPS | 136.2 IPS | 0.8 | 82 | |
| 13) TOS outside entry transit time | 133.5 IPS | 135.0 IPS | 136.2 IPS | 0.8 | 82 | |
| 14) TOS outside turn transit time | 131.9 IPS | 133.2 IPS | 136.1 IPS | 0.8 | 82 | |
| 15) TOS inside turn single page transit time | 135.2 IPS | 136.6 IPS | 139.3 IPS | 1.0 | 68 | |
| 16) TOS exit single page transit time | 143.2 IPS | 144.8 IPS | 147.2 IPS | 1.0 | 67 | |
| 17) Accum gate single page transit time | 153.3 IPS | 156.1 IPS | 159.9 IPS | 1.2 | 68 | |
| 18) Accum lower cnt single page transit time | 171.3 IPS | 173.3 IPS | 174.3 IPS | 1.2 | 34 | |
| 19) Accum upper cnt single page transit time | 168.6 IPS | 171.0 IPS | 174.0 IPS | 1.4 | 34 | |
| 20) TOS inside turn page overlap | 5.1 Inches | 5.9 Inches | 6.5 Inches | 0.4 | 48 | |
| 21) TOS exit page overlap | 4.9 Inches | 5.7 Inches | 6.3 Inches | 0.4 | 48 | |
| 22) Accum gate page overlap | 4.0 Inches | 5.2 Inches | 5.9 Inches | 0.5 | 48 | |
| 23) Accum upper cnt page overlap | 3.5 Inches | 4.6 Inches | 5.2 Inches | 0.5 | 16 | |
| 24) Accum lower cnt page overlap | 3.6 Inches | 4.9 Inches | 6.1 Inches | 0.7 | 32 | |
| 25) Lower Accum Clutch Release to Exit Cell | 44.0 mSec | 44.9 mSec | 46.0 mSec | 0.5 | 34 | |
| 26) Upper Accum Clutch Release to Exit Cell | 44.8 mSec | 46.2 mSec | 48.3 mSec | 0.7 | 33 | |
| 27) Rate at which Sets Leave Accumulator | 171.9 mSec | 432.5 mSec | 2,268.5 mSec | 267.1 | 67 | Warn |
| 28) Accum Exit Cell Transit Time | 126.6 IPS | 128.5 IPS | 130.2 IPS | 0.9 | 68 | Warn |
| 29) Folder Transit Time | 53.9 mSec | 55.2 mSec | 57.6 mSec | 0.6 | 68 | |
| 30) Collector Input Cell Arrival Rate | 171.8 mSec | 432.5 mSec | 2,268.5 mSec | 267.1 | 67 | Warn |
| 31) Collector Input Cell Transit Time | 31.3 mSec | 32.5 mSec | 33.9 mSec | 0.5 | 68 | |
| 32) Collector Dump Cell Transit Time | 30.7 mSec | 32.7 mSec | 36.5 mSec | 1.4 | 64 | |
| 33) Collector output dump rate | 1,487.5 CPH | 9,316.0 CPH | 14,076.2 CPH | 2,227.3 | 63 | |

Warnings and Errors List
3) Error: Lowest value is below limit of 100 IPS
27) Warning: Lowest value is close to lower limit of 170 mSec
28) Warning: Highest value is close to upper limit of 131 IPS
30) Warning: Lowest value is close to lower limit of 170 mSec

FIG.6(d)

AUTOMATED METHODS AND SYSTEMS FOR ANALYZING DATA ASSOCIATED WITH AN INDUSTRIAL PROCESS

CROSS-REFERENCE TO RELATED APPLICATION

This application is a divisional of U.S. patent application Ser. No. 09/434,406, filed Nov. 4, 1999 and issued Sep. 23, 2003 as U.S. Pat. No. 6,625,567, incorporated herein by reference in its entirety.

TECHNICAL FIELD

The present invention relates to methods and systems for analyzing data relating to events occurring in industrial processes. More particularly, the present invention relates to automated methods and systems for analyzing time-tagged data associated with events occurring in industrial processes.

BACKGROUND ART

Time-tagged data may be used to record events that occur in industrial processes. For example, in paper or sheet article processing, such as mail processing, machines such as, for example, inserters, turnover sequencers, accumulators, folders, and collectors include optical sensors that monitor the flow of sheet articles through the machines. The sheet articles can also include individual or stacked, folded or unfolded sheet articles such as envelopes, envelope inserts and other suitable sheet articles.

Each sheet article processing machine can comprise a processor, a memory buffer, and a communications circuit, all of which can cooperate to produce time-tagged data for a machine. The optical sensors can be used to detect events, such as the presence of a sheet of paper. The processing circuit receives the data from each of the sensors and associates a time value with the output of each sensor. The processing circuit can also convert the output into a code or text string indicative of the event detected by each sensor. The combination of a time value and a code or text string indicative of an event that occurred in an industrial process is referred to herein as "time-tagged data". The communication circuits of each of the machines transmit the time-tagged data to a central location for storage.

The central location can be a suitable computer that communicates with each of the machines, e.g., using a serial interface, to receive the time-tagged data from the machines. The time-tagged data can be stored as a log file in a bulk storage medium, such as a hard disk, at the central location. Each line of data in the log file is referred to as an entry. Each entry contains one unit of time-tagged data, i.e., one time tag and one event portion. The entries in the log file are analyzed manually by a technician or an engineer to identify problems associated with the industrial process.

One problem with this method of recording and analyzing data regarding an industrial process is that time-tagged data is difficult to interpret. For example, because time-tagged data is output from multiple sensors on multiple machines or multiple parts of the same machine, and because many events can occur simultaneously, no clear sequence of time-tagged data relating to a single event appears in the log file. Entries recorded by a single sensor can be interspersed with other entries in the log file. In addition, the text or codes associated with each event might not readily convey to the observer the nature of the event. As a result, skilled technicians or even engineers can be required to analyze the time-tagged data. Because of the complex nature of the time-tagged data, extra labor can be required even for skilled persons to interpret the time-tagged data.

The following lines of text are an example of time-tagged data recorded in a log file for a paper processing operation:

0000.013977 00.465718 ??.?????? BIN_MUX_IN CLR-board=0,port=06, pin=000

0000.014343 00.465718 ??.?????? BIN_MUX_IN CLR-board=0,port=06,pin=000

0000.027557 00.465718 ??.?????? BIN_MUX_IN SET-board=0,port=05, pin=000

0000.031738 00.465718 ??.?????? BIN_MUX_IN CLR-board=0,port=06, pin=000

0000.033447 00.465718 ??.?????? HTA Variable-WRITE: I#3219, val=65535/Oxffff 0000.033569 00.465718 ??.?????? HTA Page Data-INSIDE: s#=16,p#=2,tg=73,ct=1

0000.033661 00.000091 00.000091 FED_EOS-HTA Page Data: 1ST_SUBSETFOLD_LIMIT 0000.061371 00.465718 ??.?????? BIN_MUX_IN SET-board=0,port=09,pin=000

0000.061798 00.465718 ??.?????? BIN_MUX_IN SET-board=0,port=09,pin=000

0000.062683 00.465718 ??.?????? HTA Variable-WRITE: I#2419, val=8/0x0008

In each log file entry, the numbers on the left side indicate the event occurrence time in milliseconds measured from a predetermined start time. The text on the right side of each entry indicates the type of event, the name of the sensor that detected the event, and variable values associated with the event. As can be seen from the data above, it can be difficult to determine a real-world event from the event portion of each entry. The difficulty is increased when an event of interest spans multiple separated time-tagged data entries.

In light of these difficulties, there exists a long-felt need for improved methods and systems for analyzing time-tagged data, identifying events in an industrial process based on the time-tagged data, and presenting the data in a format that is easily understood.

DISCLOSURE OF THE INVENTION

The present invention includes automated methods and systems for analyzing time-tagged data. The phrase "time-tagged data", as used herein, refers to any data associated with an industrial process that has a time value or time-tag indicating when an event occurred and that has an event portion that indicates the nature of an event. The methods and systems according to the present invention analyze the time-tagged data by applying computer-implemented state machines to time-tagged data entries to produce data indicative of real-world events that occur in an industrial process. Statistical measures are computed for the data output from the state machines, and the statistical measures are compared to design limits. The statistical measures and the results of comparing the statistical measures to the design limits are presented to a user in a format that facilitates interpretation of the time-tagged data.

According to another aspect, the present invention includes methods and systems for analyzing non-time-tagged data associated with an industrial process and presenting output in a manner that facilitates understanding of the data.

Accordingly, it is an object of the present invention to provide novel automated methods and systems for analyzing time-tagged data.

It is another object of the invention to provide methods and systems for analyzing time-tagged data to produce output that facilitates interpretation of the time-tagged data.

It is another object of the invention to provide methods and systems for analyzing non-time-tagged data associated with an industrial process.

These objects and others are met in whole or in part by the present invention. Some of the objects of the invention having been stated hereinabove, other objects will become evident as the description proceeds, when taken in connection with the accompanying drawings, as best described hereinbelow.

BRIEF DESCRIPTION OF THE DRAWINGS

A description of the present invention will now proceed with reference to the accompanying drawings of which:

FIG. 6(d) is a computer-generated image of a report indicating results of analyzing time-tagged data according to an embodiment of the present invention.

DETAILED DESCRIPTION OF THE INVENTION

In accordance with the present invention, novel automated methods and systems for analyzing time-tagged data and non-time-tagged data are provided. The automated methods and systems for analyzing time-tagged data and non-time-tagged data according to the present invention will be explained in the context of flow charts and state diagrams. It is understood according to this invention that the flow charts and the state diagrams can be implemented in hardware, software, or a combination of hardware and software. Thus, the present invention can include computer program products comprising computer-executable instructions embodied in computer-readable media for performing the steps illustrated in each of the flow charts or implementing the state machines illustrated in each of the state diagrams.

Figure 1:
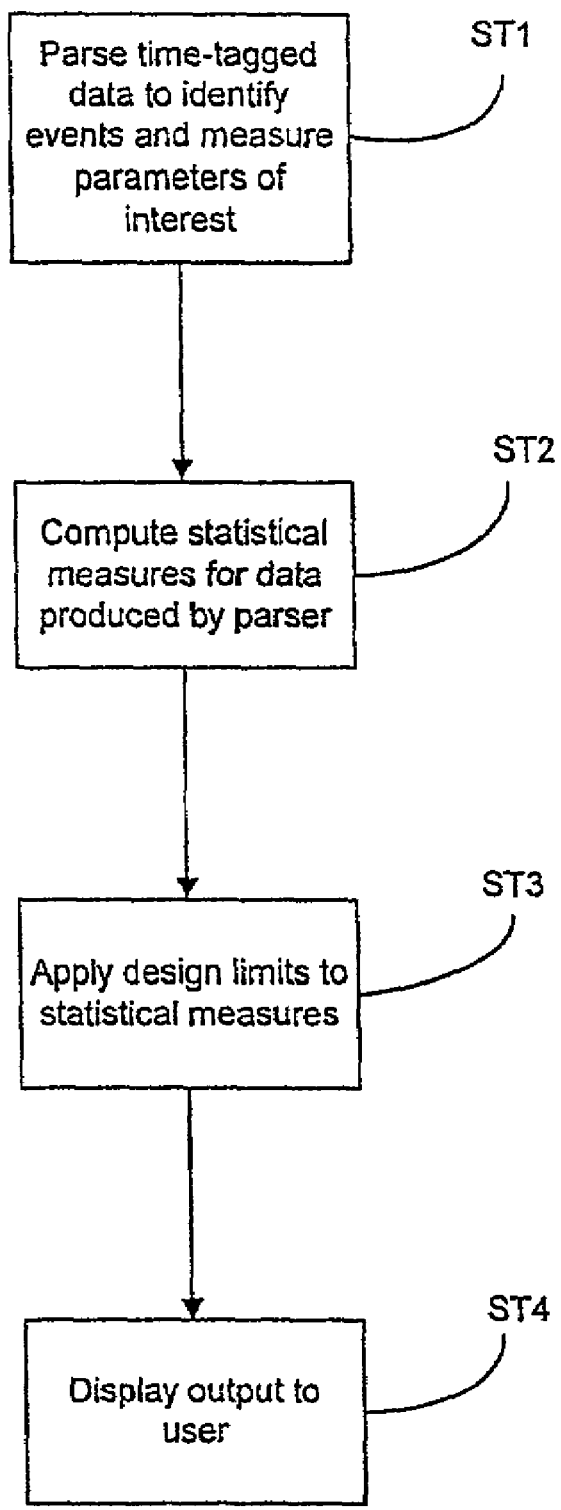
FIG. 1 is a flow chart illustrating exemplary steps that can be performed by an automated system for analyzing time-tagged data according to an embodiment of the present invention.

FIG. 1 is a flow chart illustrating steps that can be performed by an automated system for analyzing time-tagged data according to an embodiment of the present invention. In step ST1, the system parses time-tagged data to identify events and measure parameters of interest. In step ST2, the system computes statistical measures, such as mean values, minimum values, maximum values, standard deviations, modes, medians, and variances, of parameters measured during the parsing of the time-tagged data. In step ST3, the system applies limits to the statistical measures data. The limits can be used to identify whether the machine or machines is or are operating within acceptable design tolerances. Limits can vary by type and value for each measured parameter. In step ST4, the system presents or displays output to a user. The output can include the statistical measures and the results of comparing statistical measures to the design limits. If the statistical measures fall outside of the design limits, the user can be alerted through any suitable means, such as through display of an alert message on a computer display device. The system may also warn the user if the measures are close to but do not exceed a design limit. Warning the user when operating conditions are close to but not in excess of design limits allows the user to identify a problem before a failure occurs. Each of the steps illustrated in FIG. 1 will now be discussed in further detail.

Figure 2:
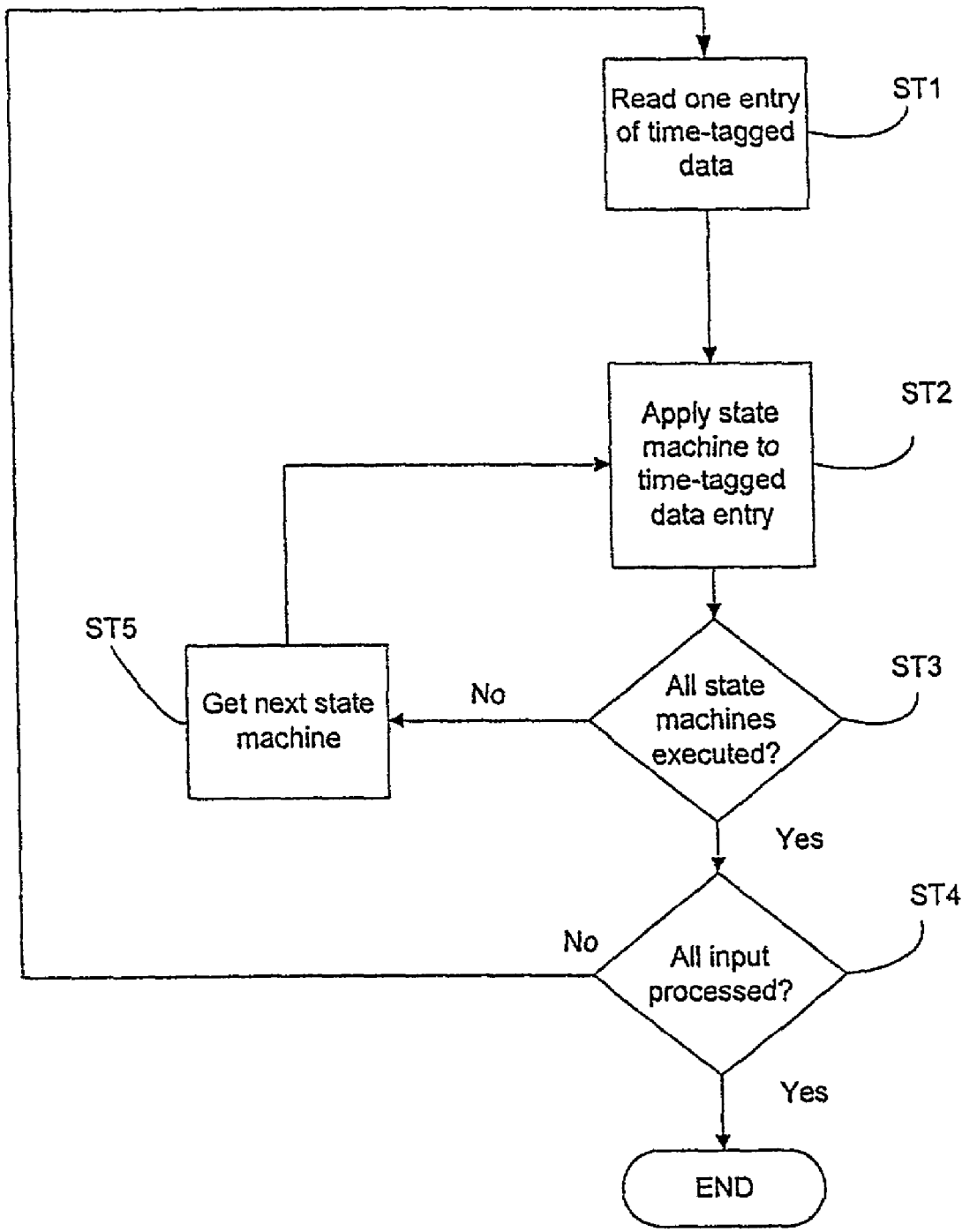
FIG. 2 is a flow chart illustrating a parser for parsing time-tagged data according to an embodiment of the present invention.

FIG. 2 illustrates an exemplary parser for parsing time-tagged data according to an embodiment of the present invention. In step ST1, the parser reads one entry of the time-tagged data. For example, the parser can access a log file containing the time-tagged data and read the first entry from the log file. The parser can execute on the same computer or on a different computer than the computer that stores the log file. If the parser executes on the same computer, the parser can access the memory location containing the log file to read the time-tagged data. If the parser resides on a remote computer, the parser can communicate with the computer storing the log file, in order to access the time-tagged data.

The present invention is not limited to analyzing time-tagged data stored in a log file. For example, in an alternative embodiment of the present invention, the parser can receive the time-tagged data in real time from machines performing an industrial process. In such an embodiment, each unit of time tagged data, can be received, processed, and either stored for further analysis or discarded.

According to an important aspect of the invention, as the parser reads the time tagged data, the parser preferably applies one or more state machines to the time-tagged data to identify events of interest. For example, in step ST2 of FIG. 2, the parser applies a first state machine to one entry of the time-tagged data. The first state machine can analyze the data to identify an event or events occurring in an industrial process and produce output relating to the event or events. In step ST3, the parser determines whether all of the state machines have been executed. If all of the state machines have been executed, the parser determines whether all of the time-tagged data has been analyzed (step ST4). If all of the data has been analyzed, the parser ends, and the program computes statistical measures for the data produced by the state machines (Step ST2 in FIG. 1).

In step ST3 of FIG. 2, if all of the state machines have not been executed, the parser preferably applies the next state machine to the current time-tagged data entry (Steps ST4 and ST2). Thus, according to one embodiment of the invention, a series of state machines are applied to each time-tagged data entry before proceeding to the next time-tagged data entry. In an alternative embodiment of the present invention, each state machine can be applied to all of the time-tagged data received and/or stored in a log file before applying the next state machine. However, this embodiment is less desirable than applying all state machines to each entry before proceeding to the next entry because some state machines require data produced by other state machines. The difficulty in communicating data among state machines is increased when state machines are applied in full before applying subsequent state machines. Once all of the state machines have been applied to all of the data, control returns to step ST2 in FIG. 1 where statistical measures are computed for the output produced by application of the state machines to the time-tagged data.

Figure 3:
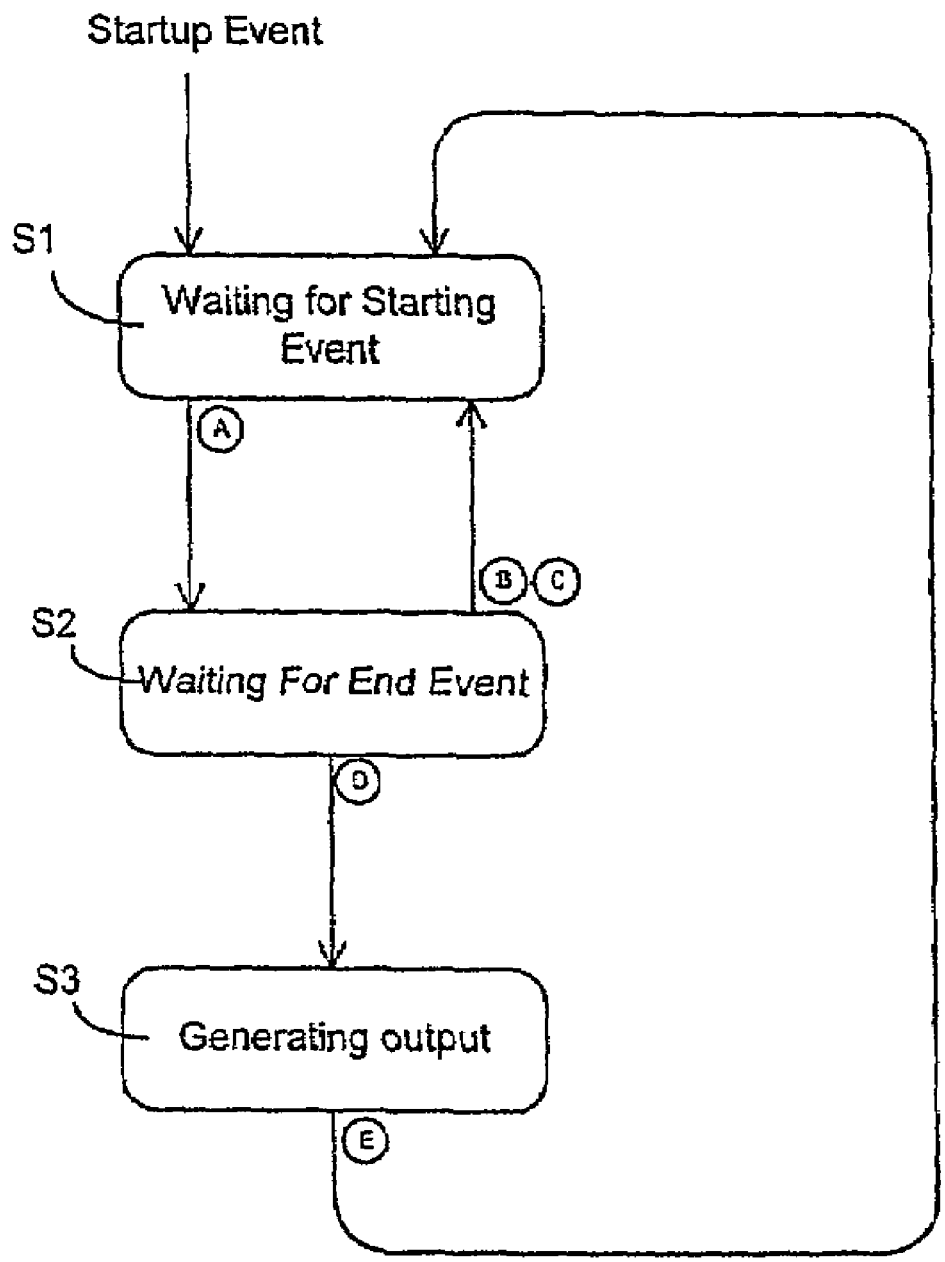
FIG. 3 is a state diagram of a state machine for identifying starting and ending events associated with an industrial process according to an embodiment of the present invention.

FIG. 3 illustrates an exemplary state machine that can be applied to time-tagged data in order to measure the time between starting and ending events associated with an industrial process. For example, in paper processing, the starting event can be the activation of a vacuum solenoid of a sheet feeder. The ending event can be the detection of one or both edges of a sheet of paper by a sensor, such as a mechanical sensor, an optical sensor, a magnetic sensor, or an electrical sensor, associated with the sheet feeder. The following event list illustrates, without limitation, the exemplary events that can be monitored by the state machine illustrated in FIG. 3:

Event List

A) Vacuum solenoid activated
B) System error detected
C) Motor power disabled
D) Lead edge of paper detected at photocell
E) Finished making output.

In the event list, events A and D are the starting and ending events for which elapsed time can be measured. Events B, C, and E are other events that can cause transitions between states.

The state machine illustrated in FIG. 3 includes a plurality of states associated with the industrial process being monitored. In the illustrated embodiment, the states are:
S1: Waiting for Starting Event;
S2: Waiting for Ending Event; and
S3: Generating Output.

The arrows between the states in the state diagram represent state transitions. The events or state machine inputs that cause the transitions are indicated by letters A–E beside each arrow. The operation of the parser in applying the state machine to a log file containing multiple entries of time-tagged data will next be explained in detail.

In state S1, the state machine "waits" for a starting event to occur. Waiting for a starting event to occur can include analyzing log file entries until a log file entry corresponding to the event or events of interest is located. As discussed above with respect to FIG. 2, the parser can apply multiple state machines to each log file entry before proceeding to the next log file entry. Thus, for state Si of the state machine illustrated in FIG. 3, the parser determines whether the current log file entry corresponds to event A, "Vacuum solenoid activated". In order to determine whether the current log file entry indicates the event of interest, the parser can apply a pattern matching algorithm to the event portion of the entry. The pattern matching algorithm can be any suitable algorithm for matching the text string or code in the event portion of the entry with a known text string or code corresponding to the event of interest. For example, the pattern matching algorithm can be similar to or the same as pattern matching algorithms used in Internet search engines or search programs of the Unix operating system.

An example of a time-tagged data entry that identifies the starting event or activation of a solenoid is as follows:

Event A: Solenoid Activation 0002.752235 00.000274 00.095429 SFVACSOL-BIN_OUT CLR: board=0,port=11,pin=000

As indicated by the data entry, the real-world event corresponding to the entry might not be readily identifiable to a human observer without knowledge of the meaning of text strings associated with real-world events. The parser reduces the need for users to be familiar with log file data formats by automatically identifying events of interest from the time-tagged data units.

In the illustrated embodiment, if the parser determines that the event portion of the entry corresponds to event A, "Vacuum solenoid activated", the state machine transitions to state S2 "Waiting for Ending Event". If the parser determines that the current log file entry being analyzed does not correspond to event A, then the state machine remains in state S1. Thus, the state machine automatically filters out irrelevant events, such as events from other sensors or other machines, by only changing states when the event or events of interest occur.

Once the state machine transitions to state S2 and any remaining state machines have been applied to the current entry, the parser examines the next data entry for events relevant to state S2. In the illustrated embodiment, the parser determines whether the event portion of the next data entry corresponds to event B, "System error detected", event C, "Motor power disabled, or event D "Lead edge of paper detected at photocell". If the parser determines that the event portion of the time-tagged data entry corresponds to event D, the state machine transitions to state S3.

The following is an exemplary time-tagged data entry corresponding to the detection of a sheet of paper at the solenoid:

Event D: Sheet Detected 0002.784431 00.004516 00.035156 SFENTCEL-BIN_ MUX_IN SET: board=0,port=06,pin=000

In a complex industrial process, such as paper processing, many events can occur between the activation of a solenoid and the detection of a first sheet of paper at the solenoid. For example, other solenoids can be activated and paper can be detected by other sensors. These other non-relevant events result in separation between the entries corresponding to events A an D in FIG. 3. As a result, a human analyzing the time-tagged data would be required to expend much time and effort searching the log file for events A and D. However, because the parser according to the present embodiment implements one or more state machines that automatically identify entries and sequences of entries corresponding to events of interest, the time required for analyzing time-tagged data is reduced, even when entries are interspersed with other non-relevant entries.

While in state S2, if the parser determines that the current entry corresponds to event B, "System error detected" or event C, "Motor power disabled", the state machine returns to state S1. The following entries correspond to events B and C:

Event B: System Error Detected 0007.335153 00.002685 04.211392 BASE-Error SET: SET Error=0x8251

Event C: Motor Power Disabled 0040.408212 00.000274 23.874536 SFMOTPWR-BIN_OUT CLR: board=0,port=12,pin=000

Thus, in state S2, the parser is required to check the current entry for multiple events. If the state machine returns to state S1, the parser checks the next data entry for event A, as described above.

In state S3, the state machine generates output corresponding to the parameter being measured. In the present example, the parameter is the time from the activation of a vacuum solenoid to the presence of a sheet of paper at the solenoid. The state machine can calculate the time by subtracting the time tag of the entry that caused the transition to state S2 from the time tag of the entry that caused the transition to state S4. The state machine can output the time, e.g., in milliseconds, and a text string or code indicating that the time represents solenoid activation to detection of paper. After generating the output, the state machine returns to state S1 to wait for the next starting event.

Figure 4:
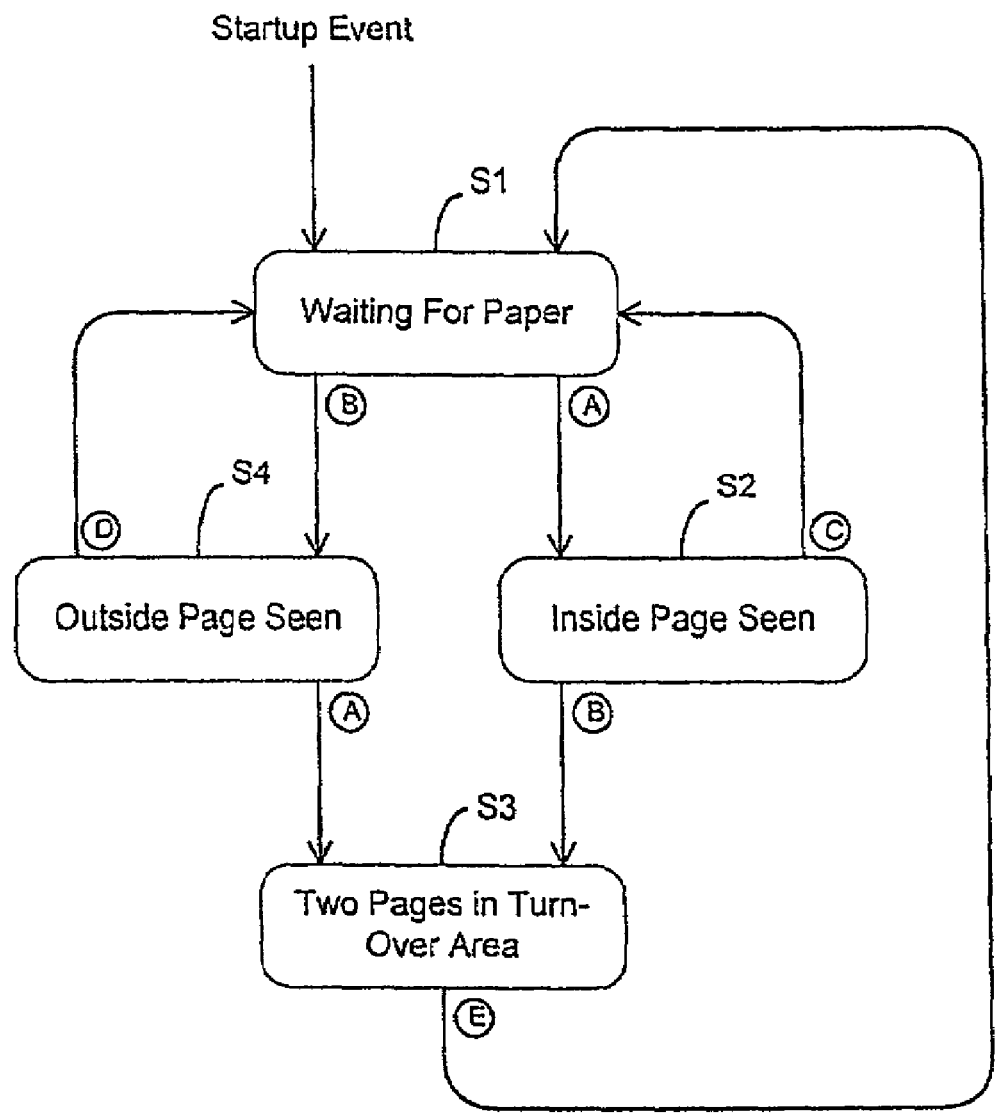
FIG. 4 is a state diagram of a state machine for identifying an overlapped page event in paper processing according to an embodiment of the present invention.

As stated above, the parser preferably executes a plurality of state machines for analyzing time-tagged data to identify multiple events and measure multiple parameters associated with the industrial process. FIG. 4 illustrates another state machine that can be executed by the parser according to an embodiment of the present invention. The state machine illustrated in FIG. 4 detects overlapped sheets of paper in the entry area of a turnover sequencer.

The following event list includes events that result in state transitions in the state machine illustrated in FIG. 4:

Event List

A) Inside page lead edge detected;
B) Outside page lead edge detected;
C) Inside turnover lead edge detected; and
D) Outside turnover lead edge detected.

In a turnover sequencer ("TOS"), sheets of paper enter side-by-side and exit in an single overlapped stream. Thus, in the event list, event A corresponds to the detection of the leading edge of the inside sheet and event B corresponds to the detection of the leading edge of the outside sheet. Event C corresponds to the detection of the lead edge of the inside sheet at the entry portion of the turnover area of the turnover sequencer. Event D corresponds to the detection of the leading edge of the outside sheet at the entry portion of the turnover area of the turnover sequencer. Overlapped sheets are identified when lead edges of the outside and inside pages are detected by the entry photocells of the TOS before either enters the turnover area.

In state S1, "Waiting for Paper", the parser determines whether the current log file entry corresponds to event A, "Inside page lead edge detected" or event B, "Outside page lead edge detected". Exemplary log file entries corresponding to events A and B are as follows:

Event A: Inside Page Lead Edge Detected 0010.02588000.00156000.324750 RTENICEL-BIN_MUX_IN SET:board=1,port=06,pin=001

Event B: Outside Lead Edge Detected 0009.995850 00.00093000.125760 RTENOCEL-BIN_MUX_IN SET:board=1,port=06,pin=001

In state S1, if event A occurs, the state machine transitions to state B, "Inside Page Seen". The parser preferably also executes any remaining state machines relevant to the current log file entry. The parser then reads the next log file entry and applies conditions relevant to state S2. In state S2, the parser determines whether the current log file entry corresponds to event B or event C, "Inside turnover lead edge detected". An exemplary time-tagged data entry corresponding to event C is as follows:

Event C: Inside Turnover Lead Edge Detected 0011.705250 00.002970 00.097980 RTTUICEL-BIN_MUX_IN SET:board=1,port=09,pin=001

If event C is detected, the state machine returns to state S1. If event B occurs when the parser is in state S2, the state machine transitions to state S3, "Two pages in Turnover Area".

In state S3, the parser generates output indicating that two pages have entered the turnover area. When the parser has completed generating the output, the state machine automatically returns to state S1 to wait for the next sheet of paper. When analyzing a log file, waiting for the next sheet of paper can include searching through remaining log file entries until another entry corresponding to event A or B is located.

When the state machine is in state S1 and event B is detected for the current log file entry, the state machine enters state S4, "Outside Page Seen". In state S4, the parser analyzes the current log file entry to determine the presence of text indicating event A or event D, "Outside turnover lead edge detected". An example of a log file entry corresponding to event D is as follows:

Event D: Outside Turnover Lead Edge Detected 0011.824260 00.012030 00.278430 RTTUOCEL-BIN_MUX_IN SET:board=1,port=09,pin=001

In state S4, if the current entry corresponds to event A, the parser enters state S3, generates the output indicating the presence of two overlapped pages, and returns to state S1. If the current entry corresponds to event D, the parser returns to state S1.

The state diagram illustrated in FIG. 4 illustrates that events result in different transitions, depending on the current state. In terms of log file entries, this means that a given log file entry can have a different meaning, depending on previous log file entries. A human observer scanning a log file would be required to remember previous log file entries to determine the significance of current log file entries. By applying state machines to each log file entry, the parser according to the present embodiment "remembers" previous information in order to determine the significance of present information. Accordingly, the burden on the user in interpreting log file data is significantly reduced. This advantage applies equally to time-tagged data that is recovered and processed in real time.

The methods and systems for analyzing time-tagged data are not limited to applying the state machines in FIGS. 3 and 4 to time-tagged data. These state machines are merely intended to illustrate, without limitation, examples of how state machines can be applied to identify real-world events and measure parameters from time-tagged data. Any suitable state machines that identify real world parameters or events from time-tagged data are within the scope of the present invention.

Figure 5:
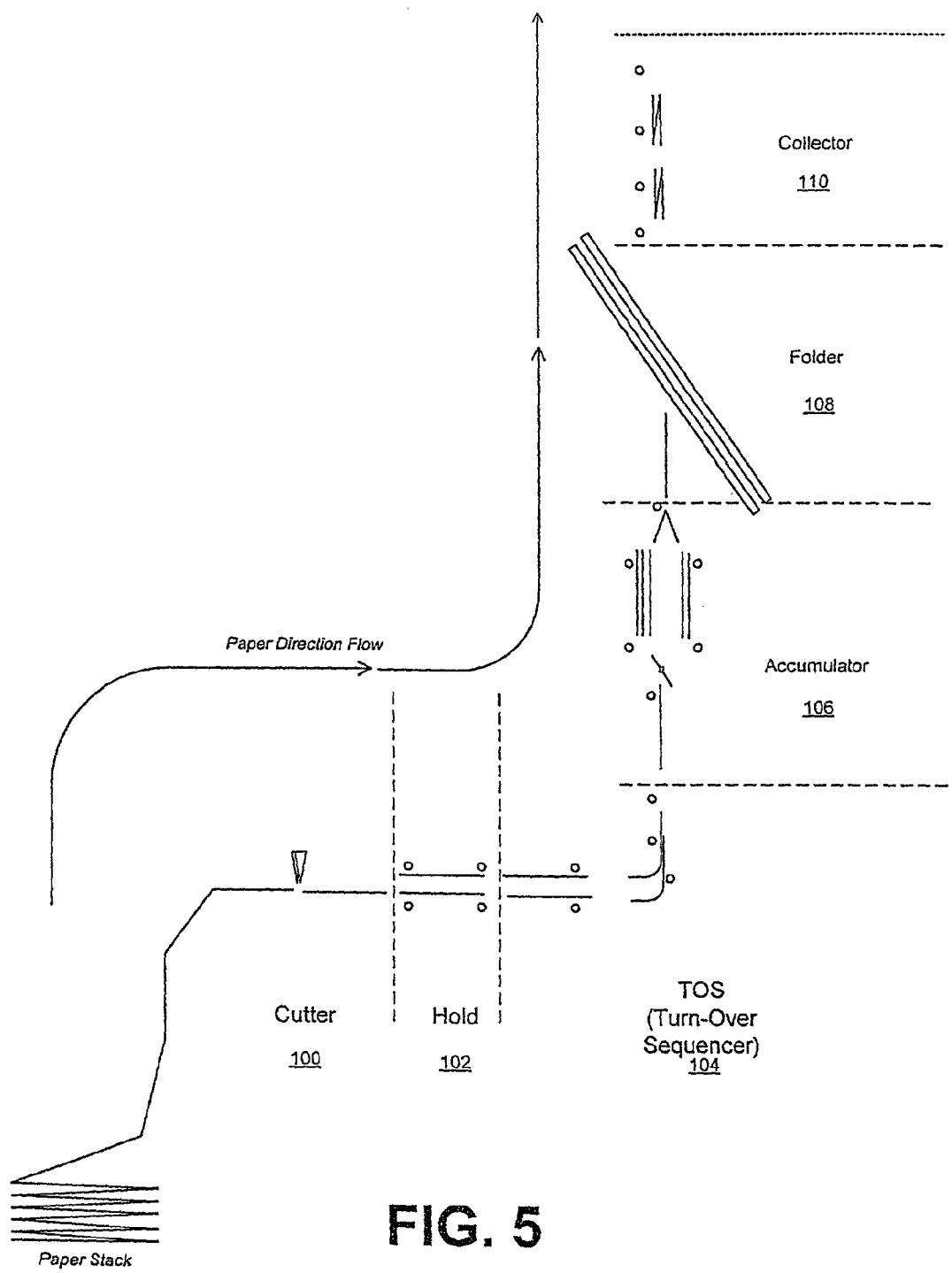
FIG. 5 is a process flow diagram of a paper processing system in which embodiments of the present invention can be used to analyze time-tagged data.

FIG. 5 illustrates an exemplary paper processing system in which the present invention can be used to analyze time-tagged data. The system includes a cutter 100, a hold area 102, a TOS 104, an accumulator 106, and a collector 110. The operation of each of these devices and examples of how state machines can be applied to analyze time-tagged data output from each of the devices will now be explained.

In the illustrated system, cutter 100 cuts pages at selected locations, e.g., at the boundaries of every page, slits pages that are printed in 2-up applications, and removes any trim (i.e., tractor pin holes along the edges of a page). State machines can be applied to time-tagged data collected from this device to:

1) Monitor the rate, e.g., in cuts per hour, at which cuts are performed; and
2) Monitor the delay, e.g., in milliseconds, between starting each cut and when read data is available.

Hold area 102 holds pages after the pages are cut and before the pages enter other parts of the system. Hold area 102 is used to adjust the timing relationship between two pages that are side-by-side in the case of a 2-up application. State machines can be applied to time-tagged data output from this device to:

1) Monitor the speed e.g., in inches per second, at which paper enters hold area 102;
2) Monitor the speed, e.g., in inches per second, at which paper leaves hold area 102;
3) Monitor the amount of time, e.g., in milliseconds, that pages stay in hold area 102;
4) Measure paper skew, e.g., in milliseconds, at entry to hold area 102; and
5) Measure difference, e.g., in milliseconds, between left and right pages leaving hold area 102 for 2-up applications.

TOS 104 moves two pages through a right-angle turn, converting the pages from two side by side streams to a single stream in which the pages may or may not overlap. Pages that move through a TOS are flipped over in the turnover process. State machines can be applied to time-tagged data output from this device to:

1) Monitor the speed, e.g., in inches per second, at which paper enters TOS 104;
2) Measure difference, e.g., in inches, between left and right pages entering TOS 104 for 2-up applications;
3) Detect single and overlapped pages and report to other state machines via flares, which are discussed in more detail below;
4) Measure the amount of overlap, e.g., in inches, at various sensors and monitor how the amount of overlap varies as a page moves through the rest of the machine;
5) Monitor the speed, e.g., in inches per second, at which paper leaves TOS 104; and
6) Monitor the paper speed, e.g., in inches per second, at sensors internal to TOS 104.

Accumulator 106 combines and stacks single and overlapped pages into multiple-page sets. Set sizes range from one page up to the maximum allowed by the mechanical limits of folder 108. Each set will be inserted into one envelope, possibly with other sets destined for the same customer. State machines can be applied to data output from this device to:

1) Monitor the speed, e.g., in inches per second, at which paper enters accumulator 106;
2) Monitor the speed, e.g., in inches per second, at which paper leaves accumulator 106;
3) Monitor the amount of time, e.g., in milliseconds, that pages stay in the area of accumulator 106;
4) Count the number of pages in each set and report to other state machines via flares;
5) Monitor time delay, e.g., in milliseconds, between releasing of a brake and detection of paper at the exit of accumulator 106; and
6) Monitor and compare times for pages in the upper deck of accumulator 106 versus the lower deck of accumulator 106.

Folder 108 folds sets in a predetermined pattern. State machines can be applied to time-tagged data output from this device to:

1) Monitor the speed, e.g., in inches per second, at which paper enters folder 108;
2) Monitor the speed, e.g., in inches per second, at which paper leaves folder 108;
3) Monitor differences in speed, e.g., in inches per second, for different set sizes; and
4) Monitor differences in speed, e.g., in inches per second, for sets from upper vs. lower decks of accumulator 106.

Collector 110 provides an area where folded sets can be combined (or collected) with other folded sets destined for the same customer, which is known as sub-set collection. State machines can be applied to time-tagged data output from this device to:

1) Monitor the speed, e.g., in inches per second, at which paper enters collector 110;
2) Monitor set distributions, e.g., in pages per set;
3) Monitor behavior differences between sets from upper and lower decks of accumulator 106; and
4) Monitor speed differences for heavy vs. light sets.

Another function of collector 110 is to provide a two-stage holding area to allow one area of an inserter (not shown) to synchronize sets passed to the next area of the inserter. This small buffer area decouples operation of these two machine parts and allows productivity to be maintained when large and small sets are mixed. State machines can be applied to time-tagged data relating to set synchronization output from this device to:

1) Monitor the speed, e.g., in inches per second, at which paper leaves collector 110;
2) Monitor speed differences, e.g., in inches per second, for heavy vs. light sets; and
3) Monitor the rate, e.g., in sets per hour, at which sets leave collector 110.

Yet another function of collector 110 is to provide the ability to divert (or remove) sets containing errors from the processing stream, such as to a divert area, without requiring operator intervention or machine stoppage. State machines can be applied to time-tagged data relating to this device function to:

1) Monitor the speed, e.g., in inches per second, at which diverted sets move through the divert area;
2) Count the number of diverted sets, e.g., in diverts per hour; and
3) Identify patterns in reasons, such as bad read, cover opened, too many pages, for diverting sets.

The present invention is not limited to applying state machines to time-tagged data from the paper processing machines illustrated in FIG. 5. For example, additional paper processing machines to which the methods and systems according to the present invention can be applied include sheet feeders, bursters, readers, and other paper processing equipment. A sheet feeder is a paper processing device that provides a stream of single sheets from a stack of cut sheets. A sheet feeder is used in place of a cutter or a burster when a customer decides to print individual sheets instead of rolled or fan folded paper. State machines can be applied to time-tagged data output from a sheet feeder to:
1) Monitor the rate, e.g., in sheets per hour, at which sheets are fed;
2) Monitor the delay, e.g., in milliseconds, between starting each page and when read data is available; and
3) Monitor the delay, e.g., in milliseconds, between command to start feeding and detection of paper movement.

As recognized by those of skill in the art, a burster is a paper processing device that provides a stream of single sheets from paper that has been horizontally perforated at page boundaries. A burster can also convert 2-up printing into a singulated stream of sheets and will remove any trim (i.e., tractor pin holes along the edges of page). State machines can be applied to time-tagged data output from a burster to:
1) Monitor the rate, e.g., in sheets per hour, at which sheets leave the burster;
2) Monitor the gap, e.g., in milliseconds, between sheets; and
3) Monitor the speed, e.g., in inches per second, at which sheets leave the burster.

As stated above, the methods and systems for analyzing time-tagged data according to the present invention can be used to analyze time tagged data output from a reader. A reader is a paper processing device that provides an area where printing on the paper representing processing instructions are obtained for each sheet that enters the machine. The reader can be separate from or combined with a burster. A reader may also be combined with or separate from cutters and sheet feeders. State machines can be applied to time-tagged data output from a reader to:
1) Monitor the rate, e.g., in sheets per hour, at which sheets enter the reader;
2) Monitor the speed, e.g., in sheets per hour, at which sheets enter the reader;
3) Monitor the speed, e.g., in inches per second, at which sheets leave the reader;
4) Monitor the gap, e.g., in milliseconds, between sheets at the entry of the reader;
5) Monitor the gap, e.g., in milliseconds, between sheets at exit of the reader; and
6) Monitor the number or count of sheets in the reader at any time.

From the above-listed devices it is apparent that in paper processing, a plurality of machines act in concert in performing a specified function, such as stuffing an envelope. This results in large quantities of time-tagged data entries that are interspersed with each other. Manually analyzing such data is impractical for untrained personnel and time consuming for personnel trained to analyze such data. However, because the methods and systems for analyzing time-tagged data apply localized state machines to the time-tagged data, real-world events and parameters associated with each device can be easily identified.

In the examples described above, parameters are measured in inches per second and milliseconds. However, the present invention is not limited to measuring parameters in milliseconds or inches per second. For example, other units for which parameters can be calculated include inches, mils (1/1000 of an inch), cycles per hour, and percentages, e.g., percentages of data points falling within a specified value range.

The present invention is not limited to methods and systems for analyzing time-tagged data for the devices described above. For example, additional devices for which the methods and systems according to the present invention may be used to analyze time-tagged data include sorters and inspection devices. Analyzing time-tagged data from any mail or paper device is within the scope of the invention.

Flares

According to an important aspect of the invention, state machines preferably share data with other state machines. More particularly, when one aid state machine produces data needed by another state machine, the first state machine preferably communicates the data to the second state machine. This inter-state-machine communication is referred to herein as a "flare".

For example, suppose state machine A executes and detects the occurrence of an event relevant to the execution of state machine B. Rather than re-executing the steps required for detecting the occurrence of the event, state machine B preferably uses the event produced by state machine A. In order to communicate the occurrence of the event to state machine B, state machine A can write data indicating the occurrence of the event in a memory location accessible by the process executing state machine B. The process executing state machine B can read the memory location containing the data. As a result, the steps required for detecting the occurrence of the event are preferably executed only once.

In addition to communicating data indicating the occurrence of an event between state machines, the parser can also communicate the time of occurrence of the event between state machines. However, communicating the time of occurrence of an event is not a required feature of the invention. For example, if the event detected by state machine A is "A man walked through the door" or "A woman walked through the door", this data can be communicated to state machine B without communicating the time of the event to state machine B. Alternatively, state machine A could communicate the time that the man or woman walked through the door to state machine B. However, if it is desirable to report a time along with the occurrence of an event, it is also preferable that the time be defined with regard to the event. For example, in the example discussed above, the time that the man or woman entered the door or completed walking through the door can be reported. Any suitable method of defining and communicating time between state machines is within the scope of the invention.

Using flares to communicate the occurrence of events between state machines greatly reduces software complexity as will be readily appreciated by those of skill in the art. As a result, programs implementing the state machines might execute more quickly. Flares also aid in the overall design of the parser. For instance, in paper processing, if a single state machine is designed to monitor an area of the machine where more than one page could pass through before that state machine produces its output (or not) for the first page, the complexity of the overall design of the parser can be increased. Flares allow the localization of state machine operation to a small area of a device, such as the turnover area of a TOS and/or related processing equipment. This localization greatly simplifies the design of each state machine that needs to span several machine areas to produce a certain output. Thus, flares can be used to provide an indication of an event which occurred elsewhere in the machine being maintained to modify the behavior of a state machine that relates to processes further downstream in the system being monitored.

One example in which flares can be useful in a paper processing environment specifically is to communicate the presence of overlapped pages in a Turnover Sequencer (TOS). In paper processing, the TOS changes paper motion at the exit into one at right angles to paper motion at the entry. This change in paper motion results in a right angle turn. The TOS is constructed to simultaneously receive two pages side-by-side (2-up) and turn them over so that the pages exit the device in a single stream. The page on the outside of the turn takes longer to pass through the TOS and therefore experiences a natural delay because it has to travel slightly farther than the inside page. This action "sequences" the pages so that the page that will come out first can be identified. This action also overlaps the pages so that two pages can travel through the paper processing machines in the same space to improve productivity. When overlapping pages in this manner, it is undesirable for the pages to pull apart, because the order in which the pages will overlap at the next stage in the paper processing sequence might not be easily determinable. Therefore, it is desirable to monitor the amount of overlap for such page groups while ignoring single pages (which are not overlapped) that pass through the TOS.

A TOS can include four photocells over which overlapped and single sheets pass. Each of the photocells can be used to measure the amount of overlap. Overlap detection is preferably started at the entry to the TOS when pages are still side-by-side. This is the principle on which the state diagram illustrated in FIG. 4 is based. From the design of the TOS, i.e., the length between the entry photocells and the turnover area, if two lead edges cross their respective entry photocells before either enters the turnover area, the pages will overlap. It might not be known which of the sheets will enter the turnover area first, as this depends on the specific shape of the paper being processed. However, if both sheets are present in the turnover area without an exit, it can be assumed that an overlapped set coming is traveling through the TOS.

The state machine illustrated in FIG. 4 can be used to detect the presence of overlapped pages. For example, the state machine can monitor the entry photocells of the TOS for lead edges. The state machine is structured so that either sheet, i.e., the inside sheet or the outside sheet, can enter the TOS first. For example, Events A and B in FIG. 4 are parallel paths to states S4 and S2, depending on whether the inside page or the outside page is detected first. In state S2 or state S4, one page has detected. If another page is detected at the TOS entry, the state machine transitions to state S4, which indicates that two pages are in the turnover area. In state S4, it can be assumed that the pages that entered the TOS are overlapped.

Because the detection of overlapped pages is an important event that can be used by downstream devices, the state machine illustrated in FIG. 4 preferably sends a flare to all other state machines. The flare preferably includes a unique name. Another state machine, for example, the state machine analyzing the data collected by the first overlap cell can be watching for that name. When the state machine analyzing data collected by the first overlap cell receives the flare, it classifies the page as an overlapped set and reports it as such. If the flare is not received, the state machine analyzing data collected by the first overlap cell assumes that the page currently detected by the state machine is only a single page. Once the state machine analyzing data collected by the first overlap cell then detects a page, the state machine waits until the trail edge of the overlapped pages is detected and "throws" another flare with a unique name that indicates an overlapped page is leaving the first turn in the TOS. That flare is "caught by" a state machine that monitors the next photocell downstream and treats the detection of pages overlapped pages. This process is repeated for all state machines for which overlapped pages are relevant.

In paper processing, a key observation to remember is that paper might (or might not) simultaneously exist under many of these photocells. Any combination of pages could be overlapped at any time. The flares indicate when a page is overlapped and the unique name of each flare allows the state machines to keep track of multiple sets of overlapped pages. If a flare is thrown and a state machine does not require the information provided by the flare, the flare is ignored.

In addition to communicating information to downstream state machines that can be discovered by upstream state machines, such as the presence of overlapping pages, flares also pass information to downstream state machines that the downstream state machines are unable to discover without flares. For example, flares can be used to pass paper attributes, such as the number of pages in a set, previous path taken by the set, or processing applied to the set, along with the paper to which the attributes apply.

For purposes of tracking overlapped pages, it can be necessary to know both the average time for a single page to pass a photocell, as well as the time for each overlapped page to pass the photocell. With flares, these two modes e of operation can be identified and tracked separately. In a preferred embodiment of the present invention, a Microsoft EXCEL® spreadsheet performs the calculations necessary to determine the amount of overlap e.g., in inches or centimeters, for each page that is seen. If the average overlaps at each of the photocells of interest in the TOS are analyzed, it is apparent that the average overlap decreases at each successive stage in the TOS. This is an effect of how the machine runs and is expected. If paper processing begins with an overlap that is too small, the pages will separate and cause sequencing problems. If the range of these values (max-min) is large, this can indicate errors in paper motion control software and other problems, such as insufficient drive pressure on paper. If the gap between lead edges varies at the start of the process, the amount of overlap variation increases as the pages proceed through the paper processing system. This variation in overlap has been observed experimentally and utilized to modify paper processing control software. An analysis tool, such as a system for analyzing time-tagged data according to the present invention, could have been used to detect this issue before releasing the paper processing control software. Thus, the methods and systems for analyzing time-tagged data according to the invention are useful in validating paper processing control software.

Statistical Analysis. Application of Design Limits, and Output Generation

Referring back to FIGS. 1 and 2, after the state machines are applied to the time-tagged data, statistical measures are computed for the output produced by the state machines, design limits are applied to the statistical measures, and the output is displayed to a user. Exemplary statistical measures that can be computed for the data output from the state machines include minimum values, maximum values, range values, mean values, median values, standard deviation values, mode values and variance values. For example, it can be desirable to know the speed at which paper passes a given sensor in paper processing. In order to determine the speed, it is necessary to know the page length and determine the amount of time for each page to pass by a photocell in the machine being monitored. The page length can be entered by the operator or extracted from the time-tagged data. In order to avoid operator errors in entering the page length, it is preferable that the page length be included in the time-tagged data being tested. The amount of time for a page to pass the sensor is measured by a state machine that finds the lead edge of the page, records the start time for the detection of the lead edge, finds the trail edge of the same page, and records an end time for the detection of the trail edge. The transit time is calculated by subtracting the start time from the end time. The state machine produces a vector of numbers for a given batch of papers being processed indicating the transit times for a given photocell.

The final item required to be considered in computing speed is the length of sensitive area under the photocell. Photocells do not have an infinitesimally small point where page edges are detected. Photocells have a "hot spot" where a page anywhere in that area will be detected. For photocells commonly used in paper processing, this area is typically about 0.2 inches for each cell, when measured empirically. The hot spot for each photocell increases the apparent page length by the length of the hot spot. Thus, when computing the speed, the length of the hot spot is added to each page length. This value is then divided by the transit time for a page. The quotient is the speed in inches per second, or other appropriate unit, for each page. The speed values for the pages being processed are stored as a vector of numbers, e.g., in a spreadsheet. From this vector, statistical measures, such as minimum, maximum, average, and standard deviation are calculated. This data can also be used to generate graphs, such as histograms, indicating trends in machine parameters.

Figure 6A:
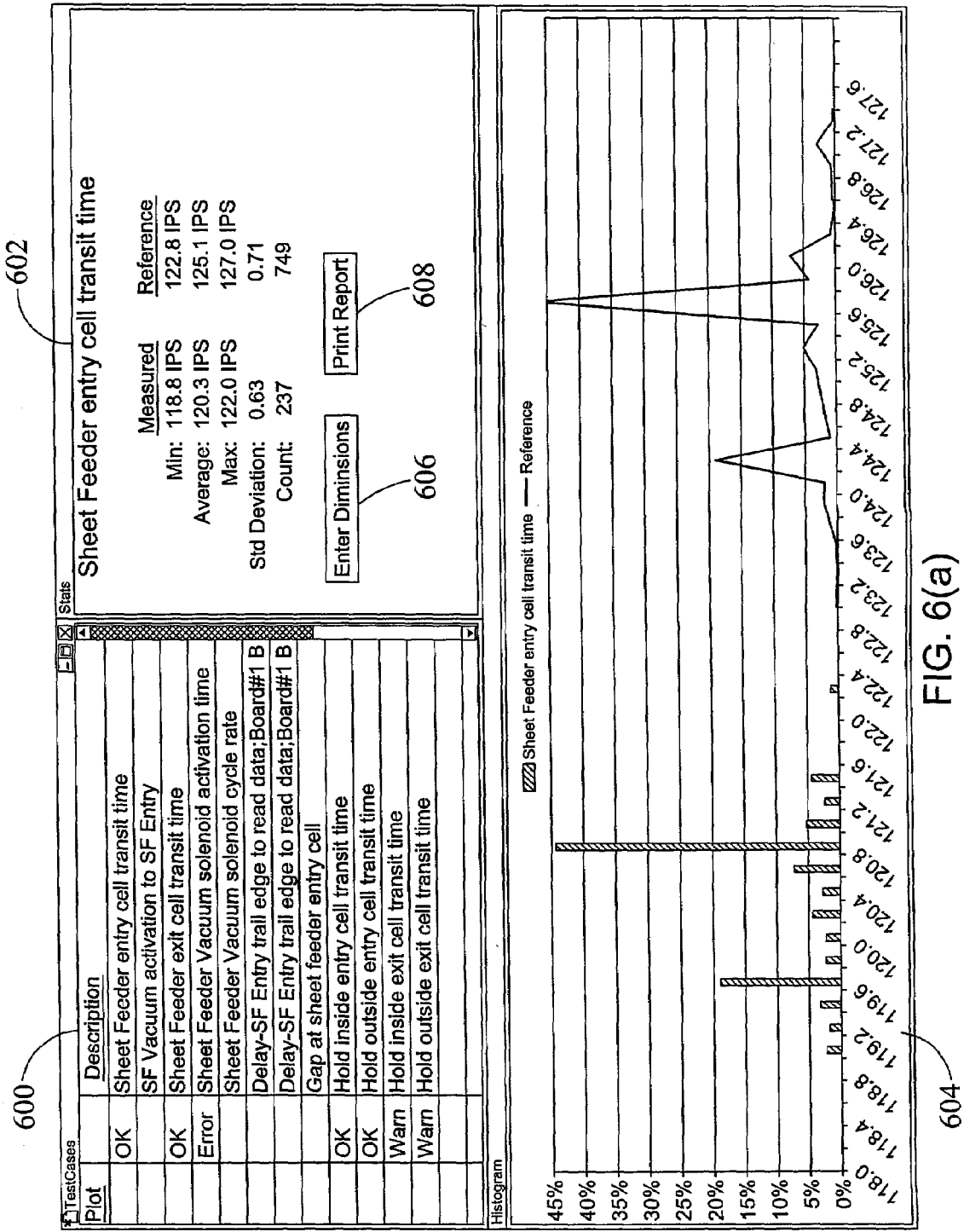
FIG. 6(a) is a computer-generated image illustrating an output window for displaying results of analyzing time-tagged data to a user according to an embodiment of the present invention.

FIG. 6(a) is an example of output that is generated from time-tagged data according to an embodiment of the present invention. The output comprises a graphical interface displayable on a computer display device that allows the user to view data in various formats. For example, in FIG. 6(a), a first window 600 displays a plurality of process parameter descriptions, such as "sheet feeder entry cell transit time", that indicate parameter values of interest calculated from time-tagged data. Window 600 also includes status indicators that indicate whether the parameters are within, near, or outside of design tolerances. In the illustrated embodiment, text messages, "OK", "Warn", and "Error", are combined with familiar colors, green, yellow, and red, to indicate to the user whether a process is operating within design limits. If a parameter is well within design limits, "OK" is displayed in a green box. If a parameter is close to, e.g., the average is within three standard deviations, of a design limit, "Warn" is displayed in a yellow box. If a parameter is outside of design limits, "Error" is displayed in a red box.

As an example of how design limits can be applied to statistical measures, a design specification for an area can require that paper should run at 120 IPS, +/−5%. This results in a lower and upper limit of 114 IPS and 126 IPS, respectively. When time-tagged data is analyzed for the machine, it can be determined that paper actually runs at an average of 122.2 IPS with upper and lower measured values of 116 IPS and 123 IPS and a standard deviation of 1.5. Since both the upper and lower measured values are within the design limits, a RED error message is not displayed. Warnings are then checked. A warning can be produced if the average is within +/−3 standard deviations of a limit. In this example the average of 122.2 plus three standard deviations is 126.7 (above the upper limit), so a warning can be indicated to the user. The average minus three standard deviations is 117.7, which is not below the lower limit, so no warning is produced for the lower design limit.

The present invention is not limited to using text and colors to inform the user of the status of a particular process parameter. Any suitable method can be used to communicate the status to a user in accordance with this invention. For example, in an alternative embodiment of the invention, an audible alarm can be used to indicate that a process parameter is outside of an acceptable range.

When the user selects one of the parameter descriptions in window 600, statistical information is displayed for that parameter description in window 602 and a histogram is displayed for that parameter in window 604. In the illustrated embodiment, "Sheet Feeder entry cell transit time" is selected in window 600. Accordingly, window 602 displays statistical data computed from measured and reference sheet feeder entry cell transit time data. Minimum, maximum, average, standard deviation, and count values are displayed in inches per second. Window 602 also includes a dimensions button 606 and a print report button 608 that allow the user to specify dimensions of paper or envelopes being processed and print a report of the statistical calculations for all of the parameters displayed in window 600.

In addition to displaying measured data in the window 604, reference data is also displayed in the window 604. The reference data can be measured data from previous paper processing operations. Simultaneously displaying the data produced from analyzing the time-tagged data with the reference data greatly facilitates interpretation of the time-tagged data. The user can visually determine the difference between the measured data and the reference data simply by viewing the graphs in the window 604. As a result, the time and labor required to identify processing problems from time-tagged data is reduced.

In addition to displaying statistical data for measured values in the window 604, reference data is preferably also displayed in the window 602. For example, in the illustrated embodiment, reference statistical values are displayed for each measured statistical value. Displaying reference statistical values in the window 604 further facilitates user interpretation of time-tagged data.

Figure 6B:
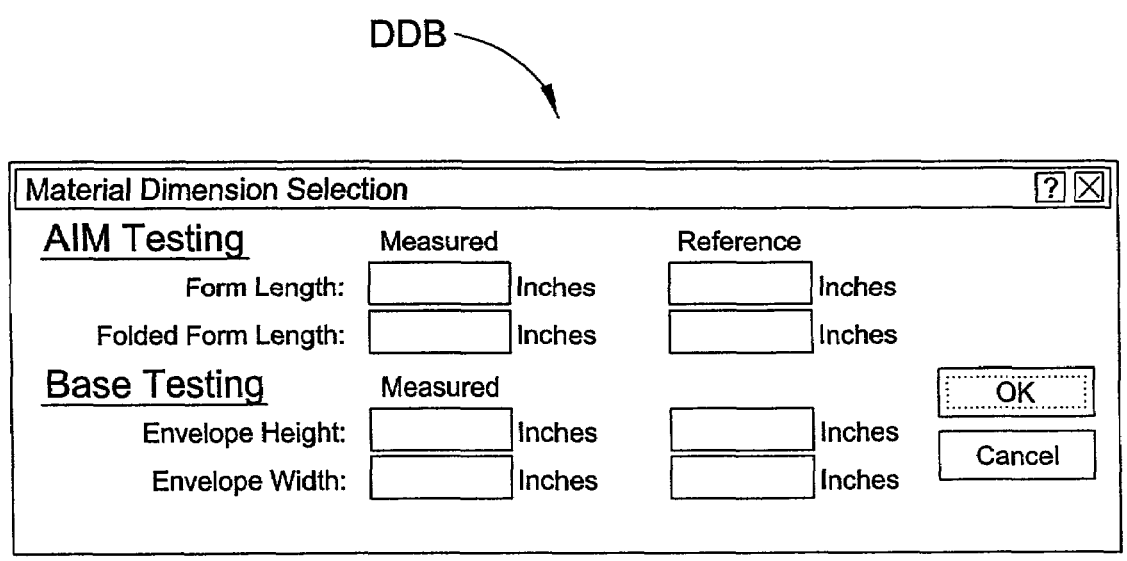
FIG. 6(b) is a computer-generated image illustrating a dimensions dialog box for receiving paper dimensions from a user according to an embodiment of the present invention.

When the user selects dimensions button 606, a dimensions dialog box, generally designated DDB, appears and allows the user to enter information that is not present in the time-tagged data, such as paper or envelope dimensions, dimensions of paper of envelopes being processed. An example of dimensions dialog box DDB is illustrated in FIG. 6(b). Dimensions dialog box DDB illustrated in FIG. 6(b) permits the user to enter the following dimensions:

1) page length;
2) folded page length;
3) envelope width; and
4) envelope height;

for both reference and measured data. This allows the user to compare operation of the machine when running jobs with different sizes of paper. The output line of each state machine has an embedded string that determines the proper units of measurement for class of data along with any design limits to use.

Because calculation of transit speed, e.g., in inches per second, depends on page or envelope dimensions. when the user changes the page or envelope dimensions using dimensions dialog box DDB illustrated in FIG. 6(b), the calculated transit speed changes. The specified dimensions should match those for the process for which the time-tagged data was collected. Otherwise, speed data can be incorrect and lead to false measurements. In order to avoid this potential problem, as stated above, the page dimensions can be included in the time-tagged data. In an embodiment in which dimensions are included in the time-tagged data, the dimensions dialog box DDB may be omitted.

Figure 6C:
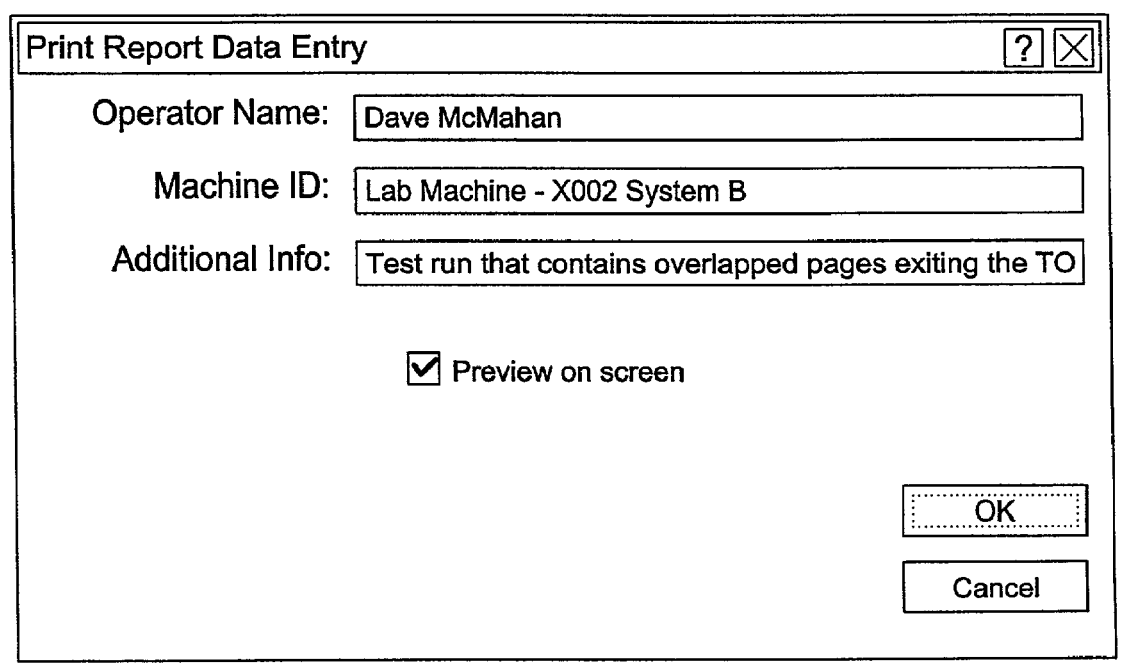
FIG. 6(c) is a computer-generated image illustrating a process information dialog box for receiving process information from a user according to an embodiment of the present invention.

Referring back to FIG. 6(a), when the user presses print report button 608, a process information dialog box appears for receiving information regarding the operator, machine, and additional information. FIG. 6(c) illustrates an example of a process information dialog box, generally designated PIDB, that can be displayed. In the illustrated embodiment, process information dialog box PIDB includes an input cell for "Operator Name" to allow the operator to enter his or her name. A second input cell labeled "Machine ID" allows the user to enter the identification number of the machine being tested. A third input cell labeled "Additional Info" allows the user to specify any additional information, such as data relating to the test being run on a machine. Process information dialog box PIDB also allows the user to select whether to display the report on the screen before printing. Once the user enters the process information dialog box illustrated in FIG. 6(c) and selects "Preview on Screen" the user clicks on "OK". A report is displayed indicating calculated statistical values for each of the parameters displayed in the window 600.

FIG. 6(d) illustrates an example of a report that may be displayed. In the illustrated embodiment, the operator name, machine identifier, and additional information entered into the process information dialog box illustrated in FIG. 6(c) are displayed on the upper portion of the report. In FIG. 6(d), the statistical measures calculated from the time-tagged data are displayed in tabular format. In the column labeled "Item Description", names of each of the parameters from the window 600 are displayed. The column labeled "Minimum" displays minimum measured values for each of the parameters. The column labeled "Average" displays average values for each of the parameters. The column labeled "Maximum" displays maximum values for each of the parameters. The column labeled "Standard Deviation" displays standard deviation values for each of the parameters. Finally, the column labeled "Status" displays the status of each of the parameters, i.e., whether the parameter is within, near, or outside of design limits. A Warnings and Errors List is displayed to summarize parameters for which warnings or errors were detected. The Warning and Errors list preferably also indicates the design limit that was exceeded, e.g., the minimum, the maximum, or average value for a parameter.

Referring back to FIG. 6(a), graph window 604 displays a histogram of sheet feeder entry cell transit time. In the histogram, the horizontal axis represents sheet feeder entry cell transit time in inches per second. The vertical axis represents the percentage of values for each transit time. The bars represent sheet feeder entry cell transit times calculated based on time-tagged data, as discussed above. The lined portion of the graph represents reference values, which may be values extracted and calculated from time-tagged data for the same machine at another time or from another machine.

The graphical interfaces for displaying the results of analyzing time-tagged data can be contrasted with the raw time-tagged data entries listed above. Presenting statistical data indicative of real-world events and measurements in an industrial process greatly facilitates interpretation of the time-tagged data. The presentation of data in FIGS. 6(a)–6(d) allows the user to immediately determine whether a machine is operating within design limits, while the raw time-tagged data entries stored in the log file may require hours of manual analysis before such a determination can be made.

Methods and Systems for Analyzing Non-Time-Tagged Data

Although the embodiments of the invention described above illustrate methods and systems for analyzing time-tagged data, the present invention is not limited to such embodiments. For example, in an alternative embodiment of the invention, data from any of the mail or paper processing operations described above may be collected, statistically analyzed, and presented to a user in a manner that facilitates user interpretation of the data, for example, as illustrated in FIGS. 6(a) and 6(d). The data analyzed might or might not have time tags. For example, mail or paper processing control software may output measured data, such as inches of paper passing a given sensor per second. The paper processing control software may determine the paper speed in inches per second based on knowledge of the length of each sheet and the time required for sheets to pass a given sensor. For example, the length of each sheet may be input into the paper processing control software and the time may be measured electronically. The length divided by the time equals the speed.

In the case where the paper processing control software outputs speed in inches per second, state machines would not be necessary to calculate this data. Thus, referring back to FIG. 1, in the present embodiment, parsing time-tagged data (step ST1) may be replaced by the steps of locating log file entries containing measurements for a given parameter or a given sensor and recording the measured values. Steps ST2–ST4 would be the same as steps ST2–ST4 described above for time-tagged data, whereby statistical measures are computed, compared to reference values, and displayed to a user. Thus, the methods and systems for analyzing time-tagged data according to the invention are equally applicable to analyzing non-time-tagged data associated with an industrial process.

It is therefore seen that the present invention provides a novel automated method and system for analyzing time-tagged data and, more generally, any data associated with an industrial process. As can be appreciated by those of skill in the art, it can also be seen that the present invention provides methods and systems for analyzing data associated with an industrial process to produce output that facilitates interpretation of the data.

It will be understood that various details of the invention can be changed without departing from the scope of the invention. Furthermore, the foregoing description is for the purpose of illustration only, and not for the purpose of limitation, as the invention is defined by the following, appended claims.

What is claimed is:

1. In a computer system having a graphical user interface including a display and a user input device, a method for displaying statistical measures for selected parameter values produced from analysis of time-tagged data from a mail or paper processing system, the method comprising:

(a) analyzing time-tagged data associated with a plurality of machines of different types associated with a mail or paper processing system for producing parameter values of the mail or paper processing system, wherein analyzing the time-tagged data comprises:

(i) reading a plurality of time-tagged data items received from the plurality of machines, wherein the reading includes accessing a log file containing the time-tagged data items, the time-tagged data items associated with an event of interest for a particular machine spanning multiple, separated entries in the log file; and (ii) parsing the time-tagged data items to identify multiple, separated data items relating to at least one event of interest for a particular machine associated with the mail or paper processing system;

(b) displaying, on the display, a first window including parameter descriptions for mail or paper processing parameter values produced from the analysis of time-tagged data, and including status information indicating the results of comparing the parameter values to reference values;

(c) displaying, on the display, a second window including a table of statistical measures for a selected parameter description produced from the analysis of time-tagged data in the first window;

(d) displaying, on the display, a third window including a graph of measured values for the selected parameter description; and (e) receiving input from a user for selecting the parameter description.

2. The method of claim 1, wherein the graph is a histogram of measured values for the selected parameter description.

3. The method of claim 1 wherein the graph is a histogram of measured values and references values for the selected parameter description.

4. The method of claim 1 comprising receiving input from the user for printing a report including the statistical measures for the selected parameter description.

5. In a computer system having a graphical user interface including a display and a user input device, a method for displaying statistical measures for selected parameters produced from analysis of time-tagged data from a mail or paper processing system, the method comprising:

(a) analyzing time-tagged data associated with a plurality of machines of different types associated with the mail or paper processing system for producing parameter values of the mail or paper processing system, wherein analyzing the time-tagged data comprises:

(i) reading a plurality of time-tagged data items received from the plurality of machines, wherein the reading includes accessing a log file containing the time-tapped data items, the time-tapped data items associated with an event of interest for a particular machine spanning multiple, separated entries in the lop file; and (ii) parsing the time-tagged data items to identify multiple, separated data items relating to an event of interest for a particular machine associated with the mail or paper processing system;

(b) displaying, on the display, a first window including parameter descriptions for mail or paper processing values produced from the analysis of time-tagged data, and including status information indicating results of comparing the parameter values to reference values;

(c) displaying, on the display, a second window including a table of statistical measures for a selected parameter description produced from analysis of time-tagged data in the first window;

(d) displaying, on the display, a third window including a graph of measured values for the selected parameter description; and (e) receiving input from the user for selecting the parameter description, and in response to receiving the input from the user, displaying, in the second window, a table of statistical measures for the selected parameter description and displaying, in the third window, a graph of measured values for the selected parameter description.

6. The method of claim 5 comprising simultaneously displaying, in the second window, reference statistical values for the selected parameter description and statistical measures for the selected parameter description.

7. In a computer system having a graphical user interface including a display, a method for displaying statistical measures for selected parameter values produced from analysis of time-tagged data from a mail or paper processing system, the method comprising:

(a) analyzing time-tagged data associated with a plurality of machines of different types associated with the mail or paper processing system for producing parameter values of the mail or paper processing system, wherein analyzing the time-tagged data comprises:

(i) reading a plurality of time-tagged data items received from the plurality of machines, wherein the reading includes accessing a log file containing the time-tagged data items, the time-tagged data items associated with an event of interest for a particular machine spanning multiple, separated entries in the log file; and (ii) parsing the time-tagged data items to identify multiple, separated data items relating to at least one event of interest for a particular machine and to measure a parameter of interest associated with the mail or paper processing system;

(b) displaying on the display parameter descriptions for mail or paper processing parameter values produced from the analysis of time-tagged data, and including status information indicating results of comparing the parameter values to reference values;

(c) displaying on the display statistical measures for a selected parameter description produced from the analysis of time-tagged data;

(d) receiving input from a user for selecting the parameter description:

(e) displaying a graph of measured values for the selected parameter description: and (f) displaying a table of statistical measures for the selected parameter description.

8. The method of claim 7, wherein analyzing the time-tagged data comprises generating statistical measure data by computing statistical measures of the parameter measured.

9. The method of claim 8, wherein analyzing the time-tagged data comprises applying limits to the statistical measures data to identify whether the machines are operating within predetermined tolerances.

* * * * *